United States Patent [19]

Riat et al.

[11] 4,228,071
[45] Oct. 14, 1980

[54] TRIAZINE CONTAINING FIBER-REACTIVE DISAZO DYESTUFFS

[75] Inventors: Henri Riat, Arlesheim; Karl Seitz, Oberwil, both of Switzerland

[73] Assignee: Ciba-Geigy Corporation, Ardsley, N.Y.

[21] Appl. No.: 881,447

[22] Filed: Feb. 27, 1978

Related U.S. Application Data

[63] Continuation of Ser. No. 644,772, Dec. 29, 1975, abandoned.

[30] Foreign Application Priority Data

Jan. 8, 1975 [CH]  Switzerland .............. 166/75
Dec. 12, 1975 [CH]  Switzerland ............. 16148/75

[51] Int. Cl.² .............. C09B 62/08; D06P 1/382; D06P 3/10; D06P 3/66
[52] U.S. Cl. .............................................. 260/153
[58] Field of Search .......................... 260/153, 146 T

[56] References Cited

U.S. PATENT DOCUMENTS

| 3,119,807 | 1/1964 | Bossard et al. ............... 260/153 |
| 3,398,133 | 8/1968 | Barben et al. ................ 260/153 |
| 3,474,084 | 10/1969 | Griffiths et al. .............. 260/153 |
| 3,542,753 | 11/1970 | Brenneisen .................. 260/153 |
| 3,646,002 | 2/1972 | Andrew et al. ............. 260/146 T |
| 3,647,778 | 3/1972 | Andrew et al. .............. 260/153 |
| 3,697,500 | 10/1972 | Ackermann et al. ........... 260/154 |

FOREIGN PATENT DOCUMENTS

501041 2/1971 Switzerland .
854432 11/1960 United Kingdom ................. 260/153

Primary Examiner—Floyd D. Higel
Attorney, Agent, or Firm—Edward McC. Roberts

[57] ABSTRACT

Fibre-reactive disazo dyestuffs of the formula

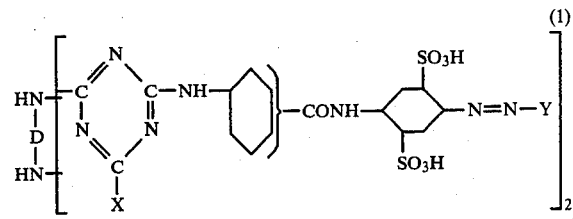

wherein X represents a halogen atom, Y represents the radical of an enolisable coupling component, and the bridging member —NH—D—NH— represents the radical of an aliphatic or aromatic diamine.

These dyestuffs are suitable for dyeing silk, leather, wool, superpolyamide, superpolyurethanes and cellulose-containing materials to produce dyeings of high depth of color and good fastness to light and wet processing.

3 Claims, No Drawings

TRIAZINE CONTAINING FIBER-REACTIVE DISAZO DYESTUFFS

This is a continuation of application Ser. No. 644,772 filed on Dec. 29, 1975 and now abandoned.

The present invention relates to fibre-reactive disazo dyestuffs of the formula

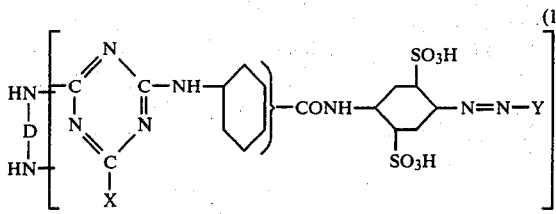

wherein X represents a halogen atom, Y represents the radical of an enolisable coupling component, and the bridging member —NH—D—NH— represents the radical of an aliphatic or aromatic diamine.

The halogen atom X in the formula (1) is a fluorine, chlorine or bromine atom. Preferably X is chlorine.

A suitable radical of a cyclic coupling component (Y) that can be enolised is, for example, the radical of a heterocyclic coupling component bound in a position adjacent to an enolised or enolisable keto group, e.g. the radical of a quinoline, of barbituric acid, of a 6-hydroxypyridone, of an acetoacetyl compound or of a pyrazolone. Preferably, Y is the radical of a sulphoarylpyrazolone.

The bridging member —NH—D—NH— is derived from an aliphatic or aromatic diamine. Thus D can be a long (e.g. having 10 or more carbon atoms) or shorter straight-chain or branched-chain alkylene radical; particularly suitable is an alkylene radical having 1 to 6 carbon atoms, e.g. ethylene, propylene, butylene, hexylene or cyclohexylene. Preferably D is an aromatic radical, e.g. a naphthylene radical, the radical of diphenyl or of stilbene, or especially a phenylene radical. This can contain further substituents, e.g. halogen atoms, low-molecular alkyl and alkoxy groups, amino, acylamino, ureido, nitro, hydroxy, carboxy and sulpho groups. D is preferably the 1,3-phenylene radical or the 4-methyl-1,3-phenylene radical.

The benzene radical in the formula (1) containing no sulpho groups is bound in the meta- or para-position with respect to the —NH— group to the —CONH— group; the para-position is preferred.

A preferred embodiment of the fibre-reactive disazo dyestuffs of the formula (1) are therefore the fibre-reactive disazo dyestuffs of the formula

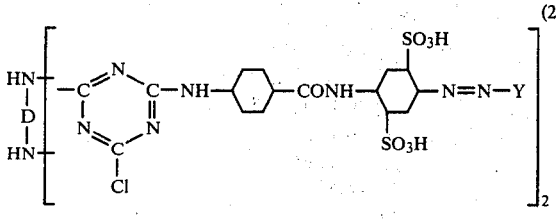

wherein Y is a sulphoaryl-pyrazolone radical, and the bridging member —NH—D—NH— is the radical of a phenylenediamine.

By virtue of the presence of two halogen atoms that can be split off in the two s-triazine radicals of the disazo dyestuffs of the formula (1), these dyestuffs are fibre-reactive.

By fibre-reactive compounds are meant compounds that are able to react with the hydroxy groups of the cellulose or with the amino groups of natural or synthetic polyamides to form covalent chemical bonds.

The fibre-reactive disazo dyestuffs of the formula (1) are produced by a process in which a trihalogeno-s-triazine, a 4-(3'- or 4'-aminobenzoylamino)-1-aminobenzene-2,5-disulphonic acid (or a 4-(3'- or 4'-nitrobenzoylamino)-1-aminobenzene-2,5-disulphonic acid, wherein the nitro group is subsequently reduced to the amino group), an aliphatic or aromatic diamine and an enolisable coupling component are combined by condensation and coupling to form fibre-reactive disazo dyestuffs of the formula (1).

Since the individual stages of the process can be performed in a variety of sequences, if required also simultaneously in some cases, various modifications of the process are possible. The starting materials to be used for each partial reaction are embraced by formula (1).

Important modes of procedure for producing the fibre-reactive disazo dyestuffs of the formula (1) are as follows:

(a) An aliphatic or aromatic diamine is condensed with a trihalogeno-s-triazine to an aliphatic or aromatic bis-(dihalogeno-s-triazinylamino)-compound. In addition, a 4-(3'- or 4'-nitrobenzoylamino)-1-aminobenzene-2,5-disulphonic acid is diazotised; the resulting product is coupled to an enolisable coupling component; in the monoazo compound obtained the nitro group is reduced to the amino group; and the amino-monoazo compound is condensed with the above-mentioned aliphatic or aromatic bis-(dihalogeno-s-triazinylamino)-compound in the molar ratio of 2:1.

Instead of condensing the amino-monoazo compound with an aliphatic or aromatic bis-(dihalogeno-s-triazinylamino)-compound, as described above, it is also possible to condense the amino-monoazo compound firstly with a trihalogeno-s-triazine, and to then condense the resulting dihalogeno-s-triazinylamino-monoazo compound with an aliphatic or aromatic diamine in the molar ratio of 2:1.

(b) An aliphatic or aromatic diamine is condensed with a trihalogeno-s-triazine to an aliphatic or aromatic bis-(dihalogeno-s-triazinylamino)-compound, and this is condensed with 2 moles of a 4-(3'- or 4'-aminobenzoylamino)-1-aminobenzene-2,5-disulphonic acid to an aliphatic or aromatic bis-(4''-amino-2'',5''-disulphophenyl-aminocarbonyl-m- or -p-phenylamino-halogeno-s-triazinylamino)-compound. This is tetrazotised, and the resulting product is coupled to 2 moles of an enolisable coupling component.

(c) A trihalogeno-s-triazine is condensed with a 4-(3'- or 4'-aminobenzoylamino)-1-aminobenzene-2,5-disulphonic acid to a 4-(3'- or 4'-dihalogeno-s-triazinylamino-benzoylamino)-1-aminobenzene-2,5-disulphonic acid; this is further condensed with an aliphatic or aromatic diamine in the molar ratio of 2:1; the condensation product is tetrazotised, and the resulting product is coupled to 2 moles of an enolisable coupling component.

(d) A trihalogeno-s-triazine is condensed with a 4-(3'- or 4'-aminobenzoylamino)-1-aminobenzene-2,5-di sulphonic acid, the formed 4-(3'- or 4'-dihalogeno-s-triazinylamino)-1-aminobenzene-2,5-disulphonic acid is diazotised, and the resulting product is coupled to an enolisable coupling component.

The monoazo compound obtained is condensed in the final stage with an aliphatic or aromatic diamine in the molar ratio of 2:1.

(a) A 4-(3'- or 4'-nitrobenzoylamino)-1-aminobenzene-2,5-disulphonic acid is diazotised, and the diazotised compound is coupled to an enolisable coupling component; in the azo compound obtained the nitro group is reduced to the amino group, the resulting aminoazo compound is condensed with a trihalogen-s-triazine, the primary condensation product obtained is further condensed with an aliphatic or aromatic diamine, and the formed secondary condensation product is condensed with a trihalogeno-s-triazine. The bireactive monoazo compound thus yielded is condensed in the final stage with an aminoazo compound produced as described above.

The procedure (d) is the preferred procedure for producing the fibre-reactive disazo dyestuffs of the formula (1).

The 4-(3'- or 4'-nitrobenzoylamino)-1-aminobenzene-2,5-disulphonic acid used as starting material in procedure (a) is known. It is produced by condensing m- or p-nitrobenzoyl chloride with p-phenylenediamine-2,5-disulphonic acid. The 4-(3'- or 4'-aminobenzoylamino)-1-aminobenzene-2,5-disulphonic acid used as starting compound for procedures (b), (c) and (d) is likewise known. It is produced by reducing in the corresponding 4-(3'- or 4'-nitrobenzoylamino)-1-aminobenzene-2,5-disulphonic acid (see above) the nitro group to the amino group.

The starting materials preferably used are cyanuric chloride, 4-(4'-aminobenzoylamino)-1-aminobenzene-2,5-disulphonic acid, a sulphoaryl-pyrazolone and a phenylenediamine.

Diazotisation of 4-(3'- or 4'-amino (or nitro)-benzoylamino)-1-aminobenzene-2,5-disulphonic acid is performed by methods known per se, e.g. by means of hydrochloric acid and sodium nitrite. Coupling with the enolisable coupling component is likewise performed by methods known per se in aqueous, acid or alkaline medium.

Condensation with trihalogeno-s-triazines, 4-(3'- or 4'-aminobenzoylamino)-1-aminobenzene-2,5-disulphonic acid and aliphatic or aromatic diamines is carried out advantageously with the use of acid-binding agents such as sodium carbonate or sodium hydroxide, and under such conditions that there still remains in the finished fibre-reactive disazo dyestuff of the formula (1) a halogen atom on the s-triazine ring, i.e. in organic solvents or at relatively low temperature in an aqueous medium.

The following may be mentioned as starting materials for the production of the fibre-reactive disazo compounds of the formula (1):

trihalogeno-s-triazines cyanuric chloride, cyanuric bromide or cyanuric fluoride;

diazo components 4-(3'-aminobenzoylamino)-1-aminobenzene-2,5-disulphonic acid,
4-(4'-aminobenzoylamino)-1-aminobenzene-2,5-disulphonic acid,
4-(3'-nitrobenzoylamino)-1-aminobenzene-2,5-disulphonic acid,
4-(4'-nitrobenzoylamino)-1-aminobenzene-2,5-disulphonic acid;

enolisable coupling components dihydroxyquinolines,
hydroxyquinoline-sulphonic acids,
barbituric acid,
3-methyl-5-pyrazolone,
α- and β-naphthyl-5-pyrazolone-sulphonic acids,
1-phenyl-3-methyl-5-pyrazolone,
1-phenyl-3-methyl-5-pyrazolone-2'-, -3'- or -4'-sulphonic acid,
1-phenyl-5-pyrazolone-3-carboxylic acid,
1-phenyl-5-pyrazolone-3-carboxylic acid-4'-sulphonic acid,
5-pyrazolone-3-carboxylic acid amide,
1-(2',5'-dichlorophenyl)-3-methyl-5-pyrazolone-4'-sulphonic acid,
1-(2'-methyl-6'-chlorophenyl)-3-methyl-5-pyrazolone-4'-sulphonic acid,
1-phenyl-3-methyl-5-aminopyrazole,
1-phenyl-3-carboxy-5-aminopyrazole,
2,6-dihydroxy-3-cyano-4-methylpyridine,
1-ethyl-3-cyano-4-methyl-6-hydroxy-pyridone-(2),
1-ethyl-3-aminocarbonyl-4-methyl-6-hydroxy-pyridone-(2),
1-ethyl-3-sulphomethyl-4-methyl-6-hydroxy-pyridone-(2),
acetoacetic acid isopropylamide,
acetoacetic acid cyclohexylamide,
acetoacetic acid monoethanolamide,
acetoacetic acid diethanolamide,
acetoacetylaminobenzene,
acetoacetylaminonaphthalene,
acetoacetylaminobenzene-2-, -3- or -4-sulphonic acid;

aliphatic and aromatic diamines ethylenediamine,
n-propylenediamine,
n-butylenediamine,
1-methyl-n-propylenediamine,
n-hexylenediamine,
2-ethyl-n-butylenediamine,
1,4-cyclohexane-bis-(methylamine),
1,3-diaminobenzene,
1,4-diaminobenzene,
1,3-diamino-4-chlorobenzene,
1,3-diamino-4-methylbenzene,
1,3-diamino-4-ethylbenzene,
1,3-diamino-4-methoxybenzene,
1,3-diamino-4-ethoxybenzene,
1,3-diamino-2,4,6-trimethylbenzene,
1,4-diamino-2,3,5,6-tetramethylbenzene,
1,3-diamino-4-nitrobenzene,
4,4'-diaminostilbene,
4,4'-diaminodiphenylmethane,
4,4'-diaminodiphenyl (benzidine),
3,3'-dimethylbenzidine,
3,3'-dimethoxybenzidine,
3,3'-dichlorobenzidine,
3,3'-dicarboxybenzidine,
3,3'-dicarboxymethoxy-benzidine,
2,2'-dimethylbenzidine,
4,2'-diaminodiphenyl (diphenyline),
3,3'-dimethylnaphthidine,
1,4-diaminobenzene-2-sulphonic acid,
1,4-diaminobenzene-2,5-disulphonic acid,
1,4-diaminobenzene-2,6-disulphonic acid, 1,3-diaminobenzene-4-sulphonic acid,
1,3-diaminobenzene-4,6-disulphonic acid,
1,4-diaminobenzene-2-carboxylic acid,
1,3-diaminobenzene-4-carboxylic acid,
1,4-diamino-2-methylbenzene,
4,4'-diaminodiphenyl oxide,
4,4'-diaminodiphenylurea-2,2'-disulphonic acid,
4,4'-diaminodiphenyloxyethane-2,2'-disulphonic acid,
4,4'-diaminodiphenylethane-2,2'-disulphonic acid,
4,4'-diaminostilbene-2,2'-disulphonic acid, and piperazine.

The new fibre-reactive tetrazo dyestuffs of the formula (1) can be isolated and processed into suitable dry dyeing preparations. Isolation is effected preferably at the lowest possible temperature by salting out and filtration. The filtered dyestuffs, optionally after the addition of diluting agents and/or buffer agents, e.g. after the addition of a mixture of equal parts of mono- and disodium phosphate, can be dried; drying is preferably performed at not too high a temperature and under reduced pressure. By the spray drying of the whole production mixture, it is possible in certain cases to obtain the dry preparations according to the invention direct, i.e. without intermediate isolation of the dyestuffs.

The dyestuffs are suitable for the dyeing and printing of the widest variety of materials, such as silk, leather, wool, superpolyamide fibres and superpolyurethanes, especially, however, cellulose-containing materials of fibrous structure, such as linen, cellulose, regenerated cellulose and, in particular, cotton. They are especially suitable for dyeing by the exhaust processes from a long liquor, from an alkaline bath having if necessary a high salt content; and by the pad-dyeing process, wherein the material is impregnated with aqueous, optionally salt-containing dyestuff solutions, and, after an alkali treatment or in the presence of alkali, the dyestuffs are fixed, if necessary by the action of heat.

The dyestuffs are suitable also for printing, especially on cotton; also for printing of nitrogen-containing fibres, e.g. of wool, silk or wool-containing mixed fabrics. They are characterised, in particular, by an enhanced reactivity and by a good affinity, and hence by a high degree of fixing. They have the advantage also that unfixed constituents can be easily washed out. The dyeings and printings obtained have a high depth of colour and have good fastness to light as well as very good fastness to wet processing, such as good fastness to washing.

For the purpose of improving fastness to wet processing, it is recommended that the dyeings and printings be subjected to a thorough rinsing with cold water and hot water, optionally with the addition of an agent having a dispersing action and promoting the diffusion of the unfixed constituents.

Except where otherwise stated in the following Examples, 'parts' denote parts by weight, percentages are given as percent by weight, and temperature values are expressed in degrees Centigrade. Between parts by weight and parts by volume there exists the same relationship as between gram and cubic centimeter.

EXAMPLE 1

38.7 parts of 4-(4'-aminobenzoylamino)-1-aminobenzene-2,5-disulphonic acid are dissolved in 200 parts of water and the solution is added to a cold aqueous suspension of 18.5 parts of cyanuric chloride. The mixture is stirred at 0° to 5° and is gradually neutralised with a diluted sodium hydroxide solution. After completion of condensation, diazotisation is performed with hydrochloric acid and sodium nitrite. The diazo compound obtained is combined with a neutral solution of 25.4 parts of 1-phenyl-3-methyl-5-pyrazolone-4'-sulphonic acid, and during coupling the pH-value is maintained with sodium carbonate at between 6 and 7. There is then added a solution of 5 parts of 1,3-diaminobenzene in 20 parts of warm water; the whole is heated to 30° and neutralised by the dropwise addition of a diluted sodium hydroxide solution. After condensation is completed, the resulting solution is concentrated in vacuo to dryness. There is obtained a fibre-reactive disazo dyestuff which dyes cellulose fibres in the exhaust process, in the presence of alkali and sodium chloride, in fast yellow shades.

The fibre-reactive disazo dyestuff has the formula

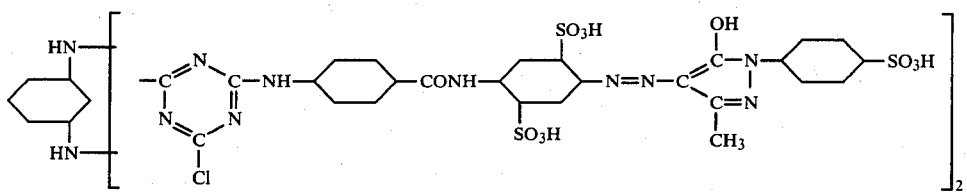

If there is used, instead of 1,3-diaminobenzene, an equivalent amount of 1,3-diamino-4-methylbenzene, then there is obtained a fibre reactive disazo dyestuff having similar properties.

In the following Table there are given a number of further examples of dyestuffs obtained in a manner analogous to that of Example 1 by condensing the diazo component of Column I with the halogenotriazine of Column II, diazotising the resulting condensation product, coupling the diazotised compound with the coupling component of Column III and, finally, condensing the coupling product with the diamine of Column IV in the molar ratio of 2:1.

| I<br>Diazo component | II<br>Halogenotriazine | III<br>Coupling component | IV<br>Diamine | V<br>Shade |
|---|---|---|---|---|
| 4-(4'-aminobenzoylamino)-1-aminobenzene-2,5-disulphonic acid | cyanuric chloride | 1-phenyl-3-methyl-5-pyrazolone-4'-sulphonic acid | 1,4-diaminobenzene | yellow |
| 4-(4'-aminobenzoylamino)-1-aminobenzene-2,5-disulphonic acid | " | 1-phenyl-3-methyl-5-pyrazolone-4'-sulphonic acid | 1,4-diaminobenzene-2-sulphonic acid | " |

-continued

| I<br>Diazo component | II<br>Halogenotriazine | III<br>Coupling component | IV<br>Diamine | V<br>Shade |
|---|---|---|---|---|
| 4-(4'-aminobenzoylamino)-1-aminobenzene-2,5-disulphonic acid | " | 1-phenyl-3-methyl-5-pyrazolone-4'-sulphonic acid | 1,3-diaminobenzene-4-sulphonic acid | " |
| 4-(4'-aminobenzoylamino)-1-aminobenzene-2,5-disulphonic acid | " | 1-phenyl-3-methyl 5-pyrazolone-4'-sulphonic acid | 1,4-diaminobenzene-2-carboxylic acid | " |
| 4-(4'-aminobenzoylamino)-1-aminobenzene-2,5-disulphonic acid | cyanuric bromide | 1-phenyl-3-methyl-5-pyrazolone-4'-sulphonic acid | 1,4-diaminobenzene | " |
| 4-(4'-aminobenzoylamino)-1-aminobenzene-2,5-disulphonic acid | cyanuric fluoride | 1-phenyl-3-methyl-5-pyrazolone-4'-sulphonic acid | 1,3-diaminobenzene | " |
| 4-(4'-aminobenzoylamino)-1-aminobenzene-2,5-disulphonic acid | cyanuric flouride | 1-(2',5'-dichlorophenyl)-3-methyl-5-pyrazolone-4'-sulphonic acid | 1,3-diamino-4-methyl-benzene | " |
| 4-(4'-aminobenzoylamino)-1-aminobenzene-2,5-disulphonic acid | " | 1-(2'-chlorophenyl)-3-methyl-5-pyrazolone-5'-sulphonic acid | 1,3-diamino-4-chlorobenzene | " |
| 4-(4'-aminobenzoylamino)-1-aminobenzene-2,5-disulphonic acid | " | 1-(2'-chlorophenyl)-3-methyl-5-pyrazolone-5'-sulphonic acid | ethylenediamine | " |
| 4-(4'-aminobenzoylamino)-1-aminobenzene-2,5-disulphonic acid | " | 1-(2'-chlorophenyl)-3-methyl-5-pyrazolone-5'-sulphonic acid | n-propylenediamine | " |
| 4-(4'-aminobenzoylamino)-1-aminobenzene-2,5-disulphonic acid | " | 1-phenyl-5-pyrazolone-3-carboxylic acid-4'-sulphonic acid | 1,4-diaminobenzene | " |
| 4-(4'-aminobenzoylamino)-1-aminobenzene-2,5-disulphonic acid | " | 1-phenyl-5-pyrazolone-3-carboxylic acid-4'-sulphonic acid | 1,3-diaminobenzene | " |
| 4-(4'-aminobenzoylamino)-1-aminobenzene-2,5-disulphonic acid | " | 1-naphthyl(2')-3-methyl-5-pyrazolone-4',8'-disulphonic acid | 1,4-diaminobenzene | " |
| 4-(4'-aminobenzoylamino)-1-aminobenzene-2,5-disulphonic acid | cyanuric acid | barbituric acid | 1,3-diaminobenzene-4-sulphonic acid | yellow |
| 4-(4'-aminobenzoylamino)-1-aminobenzene-2,5-disulphonic acid | " | " | 4,4'-diaminostilbene-2,2'-disulphonic acid | " |
| 4-(4'-aminobenzoylamino)-1-aminobenzen-2,5-disulphonic acid | " | 1-ethyl-3-aminocarbonyl-4-methyl-6-hydroxy-pyridone(2) | 1,4-diaminobenzene | " |
| 4-(4'-aminobenzoylamino)-1-aminobenzene-2,5-disulphonic acid | " | 1-ethyl-3-sulphomethyl-4-methyl-6-hydroxy-pyridone-(2) | " | " |
| 4-(4'-aminobenzoylamino)-1-aminobenzene-2,5-disulphonic acid | " | acetoacetylaminobenzene-3-sulphonic acid | " | " |
| 4-(4'-aminobenzoylamino)-1-aminobenzene-2,5-disulphonic acid | " | dihydroxyquinoline | 1,3-diaminobenzene-4-sulphonic acid | " |
| 4-(3'-aminobenzoylamino)-1-aminobenzene-2,5-disulphonic acid | " | 1-phenyl-3-methyl-5-pyrazolone-4'-sulphonic acid | 1,4-diaminobenzene | " |
| 4-(3'-aminobenzoylamino)-1-aminobenzene-2,5-disulphonic acid | " | 1-phenyl-3-methyl-5-pyrazolone-4'-sulphonic acid | 1,3-diamino-4-methylbenzene | " |
| 4-(3'-aminobenzoylamino)-1-aminobenzene-2,5-disulphonic acid | cyanuric bromide | 1-phenyl-3-methyl-5-pyrazolone-4'-sulphonic acid | 1,3-diamino-4-methylbenzene | " |
| 4-(3'-aminobenzoylamino)-1-aminobenzene-2,5-disulphonic acid | cyanuric fluoride | 1-phenyl-3-methyl-5-pyrazolone-4'-sulphonic acid | 1,3-diamino-4-methylbenzene | " |
| 4-(3'-aminobenzoylamino)-1-aminobenzene-2,5-disulphonic acid | cyanuric chloride | 1-phenyl-3-methyl-5-aminopyrazole-4'-sulphonic acid | 1,3-diamino-4-methylbenzene | " |

EXAMPLE 2

In a manner analogous to that described in Example 1, 38.7 parts of 4-(4'-aminobenzoylamino)-1-aminobenzene-2,5-disulphonic acid are condensed with 18.5 parts of cyanuric chloride. To the condensation product obtained there is added an aqueous solution of 1,3-diaminobenzene and condensation is performed, at a temperature of 40° and at a pH-value of 6 to 7, by continuously neutralising the formed mineral acid with a diluted sodium hydroxide solution. After completion of condensation, diazotisation is performed with hydrochloric acid and 6.9 parts of sodium nitrite in aqueous solution, and the diazo compound obtained is coupled with 25.4 parts of 1-phenyl-5-pyrazolone-3-carboxylic acid-4'-sulphonic acid in the presence of excess sodium bicarbonate. There is obtained a dyestuff which dyes cotton in fast yellow shades.

EXAMPLE 3

41.7 parts of 4-(4'-nitrobenzoylamino)-1-aminobenzene-2,5-disulphonic acid are dissolved in water as sodium salt; 7 parts of sodium nitrite are added, and the mixture is introduced into 30 parts of 30% hydrochloric acid and 200 parts of ice-water. The diazo compound is added to a solution, neutralised with sodium hydroxide, of 28.4 parts of 1-phenyl-5-pyrazolone-4-carboxylic acid-4'-sulphonic acid, and the pH-value is maintained between 6 and 8 by the dropwise addition of sodium hydroxide solution. After completion of coupling, the temperature is raised to 60°, and there is added all at once an aqueous solution of 15 parts of sodium sulphide. After reduction of the nitro group to the amino group is completed, the resulting aminoazo dyestuff is salted out and filtered off.

A solution of 37 parts of cyanuric chloride in 100 parts of acetone is added to an ice-cold solution, neutralised with sodium carbonate, of 40.2 parts of 4,4'-diaminodiphenylurea-2,2'-disulphonic acid in 400 parts of water, and the mixture is stirred, with ice cooling and at a pH-value of 4 to 5, until no further amino group is detectable. To the condensation product obtained there is added an aqueous solution of 136.4 parts of the aminoazo dyestuff obtained by the procedure given in the first part of this Example. The mixture is heated to 40°, and the pH-value is held at between 6 and 7 by adding dropwise a diluted sodium hydroxide solution. After completion of condensation, the formed dyestuff is obtained by concentration of the solution in vacuo. It dyes cellulose fibres in fast yellow shades.

The identical dyestuff is obtained if condensation with cyanuric chloride is performed in the reverse sequence, i.e. if firstly the amino dyestuff is reacted with cyanuric chloride at low temperature, with the intermediate obtained being then condensed with the diamine in the molar ratio of 2:1.

EXAMPLE 4

17 parts of the reactive intermediate obtained by condensation of 2 moles of cyanuric chloride with 1 mole of 1,4-diaminobenzene-2,5-disulphonic acid is added to an aqueous neutralised solution of 38.7 parts of 4-(4'-aminobenzoylamino)-1-aminobenzene-2,5-disulphonic acid. Condensation is performed at 40°, with the reaction mixture being maintained weakly acid to neutral by the dropwise addition of a diluted sodium hydroxide solution. After completion of condensation, diazotisation of the reaction product is performed with hydrochloric acid and sodium nitrite, and the resulting yellow tetrazo compound is coupled with 25.4 parts of 1-phenyl-3-methyl-5-pyrazolone-4'-sulphonic acid in a slightly alkaline solution. The dyestuff obtained is salted out and dried. It dyes cellulose fibres in fast yellow shades.

EXAMPLE 5

68 parts of the aminoazo dyestuff obtained by the procedure described in the first part of Example 3 are condensed with 18.5 parts of cyanuric chloride at 5°. To the dichlorotriazine dyestuff obtained there is slowly added an aqueous solution of 12.5 parts of 1,3-diamino-4-methylbenzene; the reaction mixture is slowly heated to 20° and allowed to react for about 2 hours at this temperature. The dyestuff is then salted out, filtered off and again dissolved in water. A suspension of 18.5 parts of cyanuric chloride is added to the solution, and the mixture is stirred for 2 hours at 5°, with the reaction being maintained weakly acid by the dropwise addition of a diluted sodium hydroxide solution. There is then added a solution of 68 parts of the same monoazo dyestuff; the whole is heated to 40° and neutralised gradually with a sodium hydroxide solution. After concentration of the reaction solution in vacuo to dryness, the dyestuff is obtained as yellow powder.

DYEING INSTRUCTION I

Two parts of the fibre-reactive disazo dyestuff obtained according to Example 1 are dissolved, with the addition of 0.5 part of the sodium salt of m-nitrobenzenesulphonic acid, in 100 parts of water. The solution obtained is used to impregnate a cotton fabric in such a manner that its weight increases by 75%, and the treated fabric is subsequently dried.

The fabric is afterwards impregnated with a solution at 20° which contains per liter 5 grams of sodium hydroxide and 300 grams of sodium chloride; the fabric is then squeezed out to 75% increase in weight: the dyeing is steamed for one minute at 100° to 101°, soaped for a quarter of an hour in a boiling (0.3% solution of an ion-free detergent, rinsed and dried. The result is a yellow dyeing having fastness to washing and to light.

DYEING INSTRUCTION II

Two parts of the fibre-reactive disazo dyestuff obtainable according to Example 1 are dissolved in 100 parts of water.

The solution is added to 3900 parts of cold water; 80 parts of sodium chloride are added, and 100 parts of a cotton fabric are introduced into this dye bath.

The temperature is raised in 45 minutes to 90°, with additions being made after 30 minutes of 40 parts of trisodium phosphate and of a further 80 parts of sodium chloride. The temperature is kept for 30 minutes at 90°; the dyeing is then rinsed and soaped for 15 minutes in a boiling 0.3% solution of an ion-free detergent, rinsed and dried. There is obtained a yellow dyeing having fastness to washing and to light.

PRINTING INSTRUCTION

Two parts of a fibre-reactive disazo dyestuff are sprinkled, with rapid stirring, into 100 parts of a stock thickening containing 45 parts of a 5% sodium alginate thickening, 32 parts of water, 20 parts of urea, 1 part of the sodium salt of m-nitrobenzenesulphonic acid as well as 2 parts of sodium bicarbonate.

A cotton fabric is printed with the resulting printing paste on a roller printing machine, and the printed material obtained is steamed for eight minutes at 100° in saturated steam. The printed fabric is subsequently thoroughly rinsed in cold and in hot water, with the constituents not chemically fixed being thus easily removed from the fibres; and the fabric is then dried.

We claim:

1. A fiber-reactive disazo dyestuff of the formula

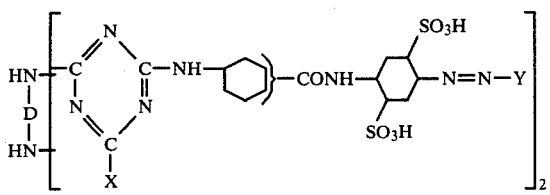

wherein

X is fluoro, chloro or bromo;

Y is the radical of a coupling component which contains an enolised or enolisable keto group is bound to the azo group in a position adjacent to the enolised or enolisable keto group, said coupling component selected from the group consisting of
dihydroxyquinolines,
hydroxyquinoline-sulphonic acids,
barbituric acid,
3-methyl-5-pyrazolone,
1-phenyl-3-methyl-5-aminopyrazole-4'-sulphonic acid,
1-(2'-chlorophenyl)-3-methyl-5-pyrazolone-5'-sulphonic acid,
α- and β-naphthyl-5-pyrazolone-sulphonic acids,
1-phenyl-3-methyl-5-pyrazolone,
1-phenyl-3-methyl-5-pyrazolone-2'-, -3'- or -4'-sulphonic acid,
1-phenyl-5-pyrazolone-3-carboxylic acid,
1-phenyl-5-pyrazolone-3-carboxylic acid-4'-sulphonic acid,
5-pyrazolone-3-carboxylic acid amide,
1-(2',5'-dichlorophenyl)-3-methyl-5-pyrazolone-4'-sulphonic acid,
1-(2'-methyl-6'-chlorophenyl)-3-methyl-5-pyrazolone-4'-sulphonic acid,
1-phenyl-3-methyl-5-aminopyrazole,
1-phenyl-3-carboxy-5-aminopyrazole,
2,6-dihydroxy-3-cyano-4-methylpyridine,
1-ethyl-3-cyano-4-methyl-6-hydroxy-pyridone-(2),
1-ethyl-3-aminocarbonyl-4-methyl-6-hydroxy-pyridone-(2),
1-ethyl-3-sulphomethyl-4-methyl-6-hydroxy-pyridone-(2),
acetoacetic acid isopropylamide,
acetoacetic acid cyclohexlamide,
acetoacetic acid monoethanolamide,
acetoacetic acid diethanolamide,
acetoacetylaminobenzene,
acetoacetylaminonaphthalene, and
acetoacetylaminobenzene-2-, -3- or -4-sulphonic acid;

and D is straight or branched chain alkylene of 1 to 6 carbon atoms, N,N'-diphenyleneurea, cyclohexylene, or is naphthylene, diphenylene, stilbenylene or phenylene which are unsubstituted or substituted by halo, lower alkyl, lower alkoxy, amino, ureido, nitro, hydroxy, carboxy or sulfo.

2. A dyestuff according to claim 1, of the formula

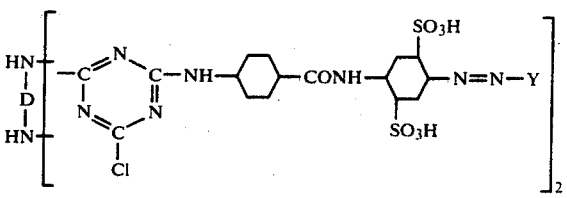

wherein

Y is the radical of a coupling component selected from the group consisting of
α- and β-naphthyl-5-pyrazolone-sulfonic acids,
1-phenyl-3-methyl-5-pyrazolone-2'-, -3'-, or -4'-sulfonic acid,
1-phenyl-5-pyrazolone-3-carboxylic acid-4'-sulfonic acid, 1-(2',5'-dichlorophenyl)-3-methyl-5-pyrazolone-4'-sulfonic acid; and
D is phenylene which is unsubstituted or substituted by halo, lower alkyl, lower alkoxy, amino, ureido, nitro, hydroxy, carboxy or sulfo.

3. Fibre-reactive disazo dyestuff according to claim 1 of the formula

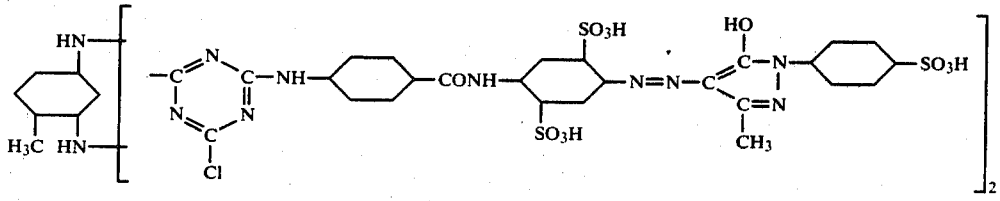

* * * * *